Aug. 30, 1949.        D. B. CARLSON        2,480,222
ADJUSTABLE V-BELT PULLEY
Filed Dec. 30, 1947                2 Sheets-Sheet 1

INVENTOR.
Dwight B. Carlson
Paul O. Pippel
Atty.

Aug. 30, 1949.                  D. B. CARLSON                    2,480,222
                         ADJUSTABLE V-BELT PULLEY
Filed Dec. 30, 1947                                       2 Sheets-Sheet 2
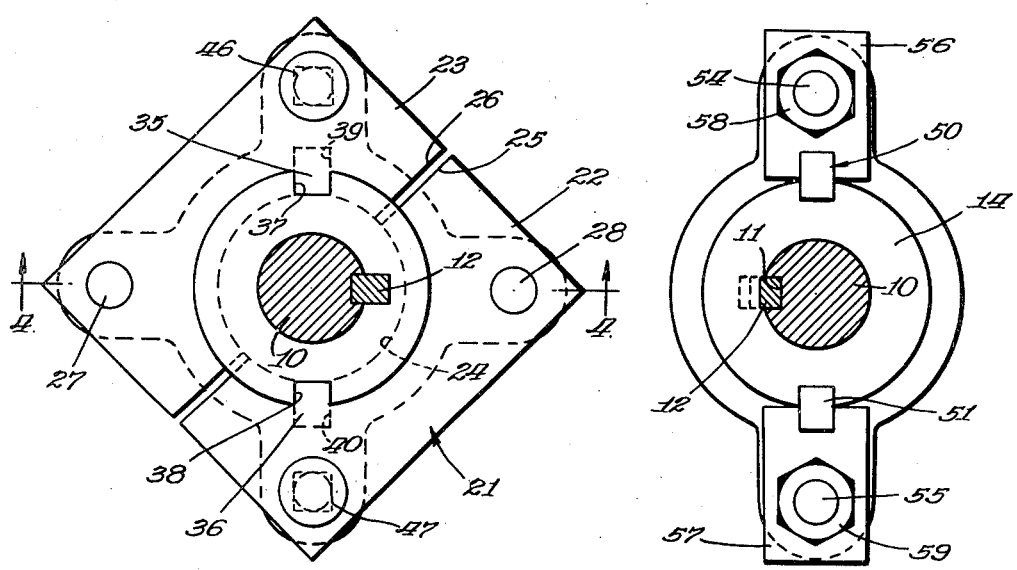
Fig. 2.                                    Fig. 3.
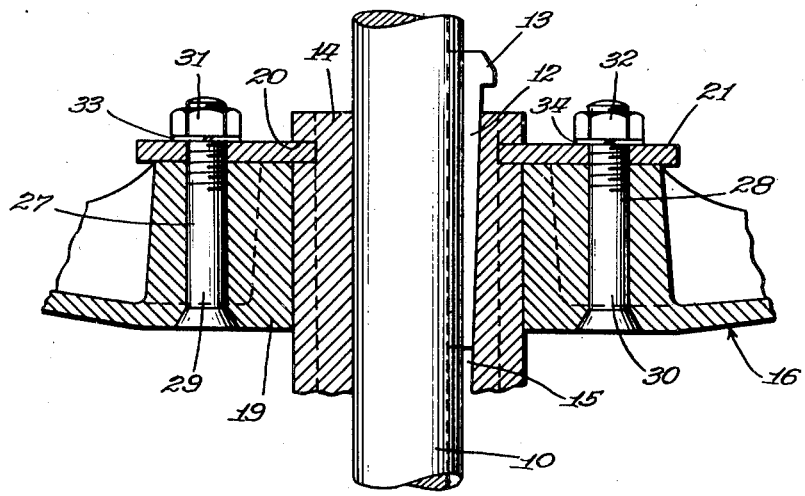
Fig. 4.
INVENTOR.
Dwight B. Carlson
Paul O. Pippel
Atty Patented Aug. 30, 1949

2,480,222

UNITED STATES PATENT OFFICE 2,480,222

ADJUSTABLE V-BELT PULLEY

Dwight B. Carlson, Rapids City, Ill., assignor to International Harvester Company, a corporation of New Jersey Application December 30, 1947, Serial No. 794,763

4 Claims. (Cl. 74—230.17)

This invention relates to a new and improved adjustable V-belt pulley and has for one of its principal objects the provision of means for adjustably spacing the side walls to effect a change in the pitch diameter of the belt.

An important object of this invention is to provide a V-belt pulley capable of accommodating a V-belt pulley throughout a range of lengths and means therein for securing a similar tension on each of the various length belts.

Another important object of this invention is to provide an adjustable V-belt pulley having means for adjustably fixing the spacing of the pulley side walls and separate means for effecting locking between the pulley sections to impart concurrent rotational drive therethrough.

A further important object of this invention is to provide an economically constructed V-belt pulley provided with means for quickly and easily changing the spacing of the pulley side walls sections and locking the pulley in adjusted position without hindering the driving of the pulley.

Other and further important objects of this invention will become apparent from the disclosures in the following specification and accompanying drawings, in which:

Figure 2 is an end view of the pulley as shown in Figure 1 and taken on the line 2—2 of Figure 1.

Figure 3 is an end elevational view of the pulley taken on the line 3—3 of Figure 1.

Figure 4 is an enlarged sectional detail view taken on the line 4—4 of Figure 2.

Figure 1:
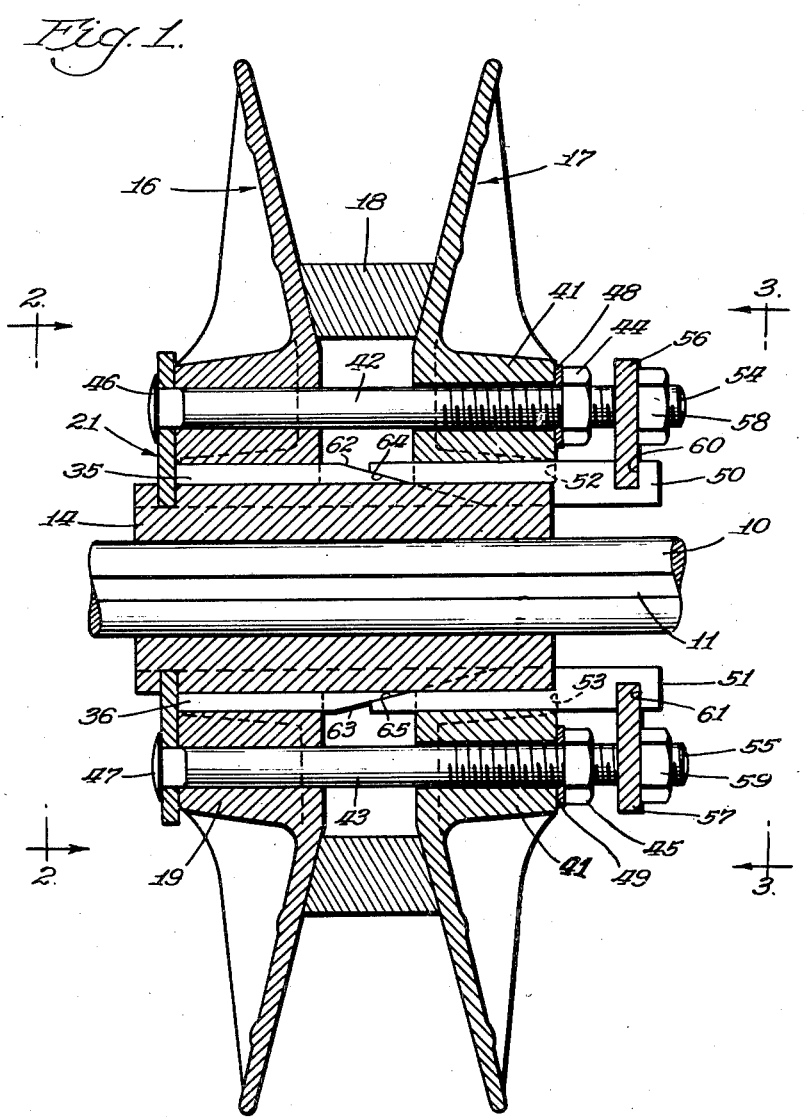
Figure 1 is a vertical sectional view of the adjustable V-belt pulley of this invention.

As shown in the drawings, the reference numeral 10 indicates generally a shaft on which the adjustable V-belt pulley of this invention is mounted. The shaft 10 is provided with a keyway slot 11 which as shown in Figures 2, 3 and 4 accommodates an elongated tapered key 12. The key 12 is provided with a head 13 at one end thereof for handling in inserting and removing the key from its position in the shaft 12. A hub 14 is mounted on the shaft 10 and is provided with an internal tapering keyway slot 15 for reception of the radial extension of the tapered key 12. The key 12 thus maintains the hub 14 fixed with respect to the shaft 10 and therefore rotation of the shaft imparts rotation to the hub.

The V-belt pulley of this invention includes cooperative and opposed side wall sections 16 and 17. These sections are adjustably moved toward and away from each other to provide for variable pulley sizes. In the spacing of the sections 16 and 17 as shown in Figure 1, a V-belt 18 would ride in the innermost position of the pulley whereas, if the sections 16 and 17 were brought together, the pulley would ride at some radially outward position depending on the particular spacing of the side walls 16 and 17.

As shown in Figure 4 the pulley section 16 is provided with a hub portion 19 which slidably engages the shaft hub 14. The hub 14 is provided with an annular groove 20 for the reception of an end holding plate 21. This plate 21, as shown in Figure 2, is divided into two portions, 22 and 23, and when placed together have a circular opening 24 at the juncture of their adjoining edges 25 and 26. The circular inner portion 24 engages the annular groove 20 of the hub 14 and the plate sections 22 and 23 are bolted to the hub 19 of the pulley section 16 by means of bolts 27 and 28, which as shown in Figure 4 have heads 29 and 30 and nuts 31 and 32 along with split lock washers 33 and 34. The heads 29 and 30 are countersunk in the inner surface of the pulley section 16 and the nuts and lock washers are drawn up on the outside of the end holding plate sections 22 and 23. The pulley section 16 is thus held immovable against longitudinal shifting on the hub 14 and thus is also immovable longitudinally on the shaft 10 by means of the taper key 12.

The pulley section 16 is further connected to the shaft hub 14 by means of key members 35 and 36 which are diametrically opposed and which engage grooves or slots 37 and 38 in the hub 14 and alined internal grooves or keyways 39 and 40 in the pulley section hub 19. The keys 35 and 36 have one end abutting the end holding plate 21 preventing them from lateral shifting in one direction.

The pulley section 17 is equipped with a hub 41 which corresponds to the hub 19 of the pulley section 16. The hub 41 slides over the shaft hub 14 and is laterally adjustable thereover. Bolts 42 and 43 pass transversely through the hubs 19 and 41 and the spacing of the pulley sections 16 and 17 is accomplished by adjustably moving the nuts 44 and 45 along their respective bolts 42 and 43. The bolts 42 and 43 have heads 46 and 47 carried against the outer face of the end holding plate 21. Lock washers 48 and 49 tend to prevent the nuts 44 and 45 from becoming loose after they are initially set for the desired spacing the pulley sections 16 and 17.

Keys 50 and 51 are slidably mounted in the keyway slots 37 and 38 in the hub 14 in the same manner as keys 35 and 36. The hub 41 is similarly provided with opposing internal keyway slots 52 and 53 and thus the pulley section 17 rotates simultaneously with the shaft 10, hub 14, and pulley section 16.

The bolts 42 and 43 have lateral extensions 54 and 55 extending beyond the adjusting nuts 44 and 45. The extensions 54 and 55 carry plate members 56 and 57 respectively. Nuts 58 and 59 threadedly engage the extensions 54 and 55 and abut the outer ends or sides of the plate or bracket members 56 and 57 and thus confine the plates to a position between the nuts 44 and 58 and 45 and 59. The inward extensions of the plates 56 and 57 toward the shaft 10 engage notches 60 and 61 in the keys 50 and 51 respectively. Lateral shifting of the plates 56 and 57 thus effects a corresponding lateral shifting of the key members 50 and 51.

The keys 35 and 36 have inclined end portions 62 and 63 for wedging engagement with similarly but oppositely inclined ends 64 and 65 of the key members 50 and 51. It has previously been stated that the key members 35 and 36 are prevented from lateral shifting in one direction because of the end plate 21. Movement of the keys 50 and 51 inwardly toward the pulley sections causes a wedging action to occur between the inclined ends 62 and 64, and 63 and 65. The wedging of the keys causes rotational drive without any lost motion from the shaft 10 to both pulley sections 16 and 17.

After the requirements for the spacing of the pulley sections 16 and 17 have been determined the device is operated in the following manner. The nuts 58 and 59 are loosened, thus withdrawing the keys 50 and 51 to permit lateral sliding movement of the pulley section 17. Should it be desired to move the pulley section 17 away from the pulley section 16 the nuts 44 and 45 would also have to be loosened. However, in the position as shown in Figure 1, the pulley section 17 is in substantially its maximum separated position from the pulley section 16 and thus a change in spacing would normally be in an inward direction. Assume, for example, we wish to move the section 17 fully inwardly so that the hubs 19 and 41 of the pulley sections abut at their inner ends. A V-belt such as 18 and having a corresponding cross section would thus ride in the pulley at substantially the outer periphery thereof. In order to reposition the pulley section 17, the nuts 44 and 45 would be drawn up on the threaded shanks of the bolts 42 and 43 until the lock washers 48 and 49 were drawn up tightly against the outer face of the hub 41. The nuts 58 and 59 are then retightened and the keys 35 and 50, and 36 and 51 wedge, whereupon drive is imparted from the shaft 10 to the pulley sections 16 and 17 through the keys 35—50 and 36—51 without imparting any torsional strain on the spacing adjusting bolts 42 and 43.

The pulley of this invention is adapted for use in variable speed arrangements wherein it is desired to change the pitch diameter of the pulley. As a rule two such adjustable pulleys are used at opposite ends of a V-belt whereby upon adjustment of both pulleys simultaneously and oppositely the length of the belt remains constant but the driving ratio between the two pulleys is changed.

Numerous details of construction may be varied throughout a wide range without departing from the principles disclosed herein and I therefore do not propose limiting the patent granted thereon otherwise than as necessitated by the appended claims.

What is claimed is:

1. An adjustable V-belt pulley comprising a relatively wide cylindrical hub having an annular groove adjacent one end, a first pulley section having a hub axially secured on said cylindrical hub, a two piece plate having an internal circular opening of a diameter substantially equal to the internal diameter of the annular groove in the cylindrical hub, said two piece plate positioned around said cylindrical hub and within the annular groove, bolt means for attaching the first pulley section to both parts of the two piece plate, key means for attaching said first pulley section to the cylindrical hub for joint rotation, a second pulley section having a hub slidable on said cylindrical hub, key means for attaching said second pulley section to the cylindrical hub for joint rotation, both of said key means having oppositely inclined inner ends and arranged to abut each other, and means for forcing the last recited key means longitudinally against the first recited key means whereby the key means wedge and hold the pulley sections in fixed position.

2. An adjustable V-belt pulley comprising a relatively wide cylindrical hub having an annular groove adjacent one end, a first pulley section having a hub axially secured on said cylindrical hub, a two-piece plate having an internal circular opening of a diameter substantially equal to the internal diameter of the annular groove in the cylindrical hub, said two piece plate positioned around said cylindrical hub and within the annular groove, bolt means for attaching the first pulley section to both parts of the two piece plate, key means for attaching said first pulley section to the cylindrical hub for joint rotation, a second pulley section having a hub slidable on said cylindrical hub, key means for attaching said second pulley section to the cylindrical hub for joint rotation, both of said key means having oppositely inclined inner ends and arranged to abut each other, and means for forcing the last recited key means longitudinally against the first recited key means whereby the key means wedge and hold the pulley sections in fixed position, and bolt means passing transversely through both of said pulley sections for adjustably spacing the second pulley section from the first pulley section.

3. An adjustable V-belt pulley comprising a relatively wide cylindrical hub having an annular groove adjacent one end, a first pulley section having a hub axially secured on said cylindrical hub, a two piece plate having an internal circular opening of a diameter substantially equal to the internal diameter of the annular groove in the cylindrical hub, said two piece plate positioned around said cylindrical hub and within the annular groove, bolt means for attaching the first pulley section to both parts of the two piece plate, key means for attaching said first pulley section to the cylindrical hub for joint rotation, a second pulley section having a hub slidable on said cylindrical hub, key means for attaching said second pulley section to the cylindrical hub for joint rotation, both of said key means having oppositely inclined inner ends and arranged to abut each other, and means for forcing the last recited key means longitudinally against the first recited key means whereby the key means wedge and hold the pulley sections in fixed position, and bolt means passing transversely through both of said pulley sections for adjustably spacing the second pulley section from the first pulley section, said means for forcing the last recited key means longitudinally including bracket members affixed to said last recited key means and extending outwardly over said bolt means for spacing the pulley sections, and nut means on said bolt means for drawing up on said bracket members.

4. An adjustable V-belt pulley comprising a cylindrical hub, a first pulley section having a hub mounted over and around said cylindrical hub, stop means on one end of said cylindrical hub limiting axial movement of said hub in one direction, key means for attaching said first pulley section and hub to the cylindrical hub for joint rotation, a second pulley section having a hub slidable on said cylindrical hub opposite said stop means, key means for attaching said second pulley section to the cylindrical hub for joint rotation, both of said key means having oppositely inclined inner ends and arranged to abut each other, and means for forcing the last recited key means longitudinally against the first recited key means whereby the key means wedge and hold the pulley sections in fixed position.

DWIGHT B. CARLSON.

REFERENCES CITED

The following references are of record in the file of this patent:

UNITED STATES PATENTS

| Number | Name | Date |
| --- | --- | --- |
| 1,740,087 | Hall | Dec. 17, 1929 |
| 2,135,467 | Metz | Nov. 1, 1938 |
| 2,209,737 | Livingston | July 30, 1940 |
| 2,434,018 | Stepanoff | Jan. 6, 1948 |